United States Patent [19]

Boaz et al.

[11] 3,790,752
[45] Feb. 5, 1974

[54] HEATABLE LAMINATED WINDSHIELD CONSTRUCTION

[75] Inventors: Premakaran T. Boaz, Southgate; Roman Surowiex, Center Line, both of Mich.

[73] Assignee: Ford Motor Company, Dearborn, Mich.

[22] Filed: Mar. 26, 1973

[21] Appl. No.: 345,168

[52] U.S. Cl. ................ 219/522, 219/203, 219/541, 219/543
[51] Int. Cl. ............................................. H05b 3/06
[58] Field of Search ... 219/203, 522, 541, 543, 544; 161/192; 244/134; 296/84

[56] References Cited
UNITED STATES PATENTS

| | | |
|---|---|---|
| 2,991,207 | 7/1961 | Miller .................................. 219/203 |
| 3,020,376 | 2/1962 | Hofmann et al. ................ 219/543 X |
| 3,288,983 | 11/1966 | Lear, Sr. .............................. 219/522 |
| 3,330,942 | 7/1967 | Whitson .............................. 219/522 |
| 3,356,833 | 12/1967 | Orcutt.................................. 219/522 |
| 3,718,535 | 2/1973 | Armstrong et al.............. 219/203 X |

*Primary Examiner*—Volodymyr Y. Mayewsky
*Attorney, Agent, or Firm*—William E. Johnson; Keith L. Zerschling

[57] ABSTRACT

A heatable, laminated windshield construction is disclosed in which an electrical connection is made to a transparent interlayer which has a conductive coating thereon. When power is supplied to the conductive coating, the result is a heating of the windshield. The connection to the conductive coating is completely sealed so that the moisture is unable to penetrate the laminated construction.

4 Claims, 2 Drawing Figures

PATENTED FEB 5 1974

3,790,752

HEATABLE LAMINATED WINDSHIELD CONSTRUCTION

BACKGROUND OF THE INVENTION

U.S. Pat. application Ser. No. 316,322 filed Dec. 29, 1972, for a vehicle windshield, assigned to the same assignee as this application, teaches a vehicle windshield construction in which an electrically conductive, laminating interlayer is bonded between a pair of transparent glass sheets to form the windshield. Electrical power is applied to the conductive material in order to defrost or defog the windshield. In order to produce a windshield which is acceptable for commercial use, the windshield must be sealed about all of its lateral edges in such a manner that moisture or other contaminants cannot penetrate into the interlayer. This application teaches an electrical connection to the conductive material on the interlayer in such a form that the area of electrical connection is sealed to moisture and other contaminant penetration.

SUMMARY OF THE INVENTION

This invention is directed to a laminated windshield construction for a vehicle and, more particularly, to an improved heatable, laminated windshield construction wherein an electrical connection to an electrically conductive, heatable interlayer within the interior of the windshield is formed so that it resists the penetration thereof by moisture and other contaminants.

In accordance with the teachings of this invention, a heatable, laminated windshield for a vehicle has a transparent interlayer having a pair of principal faces with a conductive coating on at least one of the faces. The conductive coating is one which produces heat when an electrical current is applied thereto. The transparent interlayer also has a notched out portion which would be adjacent an area of the edge of the final windshield construction. First and second laminating interlayers are positioned adjacent both principal faces of the transparent, heatable interlayer. First and second transparent glass sheets are positioned adjacent the laminating interlayers. A circuit board, including a non-conductive base with conductive paths thereon, is positioned so that a portion thereof resides within the notch of the transparent layer and another portion thereof extends out beyond the peripheral edges of the laminated windshield. Electrical circuit paths are formed, in part, on the conductive coating of the transparent interlayer and, in part, on the conductive paths of the circuit board to connect electrically the conductive paths of the circuit board to the conductive coating. An additional sealing material is provided to fill in the free volume about the notch of the transparent interlayer when the windshield is subjected to heat and pressure in a laminating operation. In a normal state, the sealing material does not fill the free volume but is flowable thereinto during the laminating operation which bonds all of the elements into a single unit to form the laminated windshield construction.

DESCRIPTION OF THE PREFERRED EMBODIMENT

Figures 1, 2:
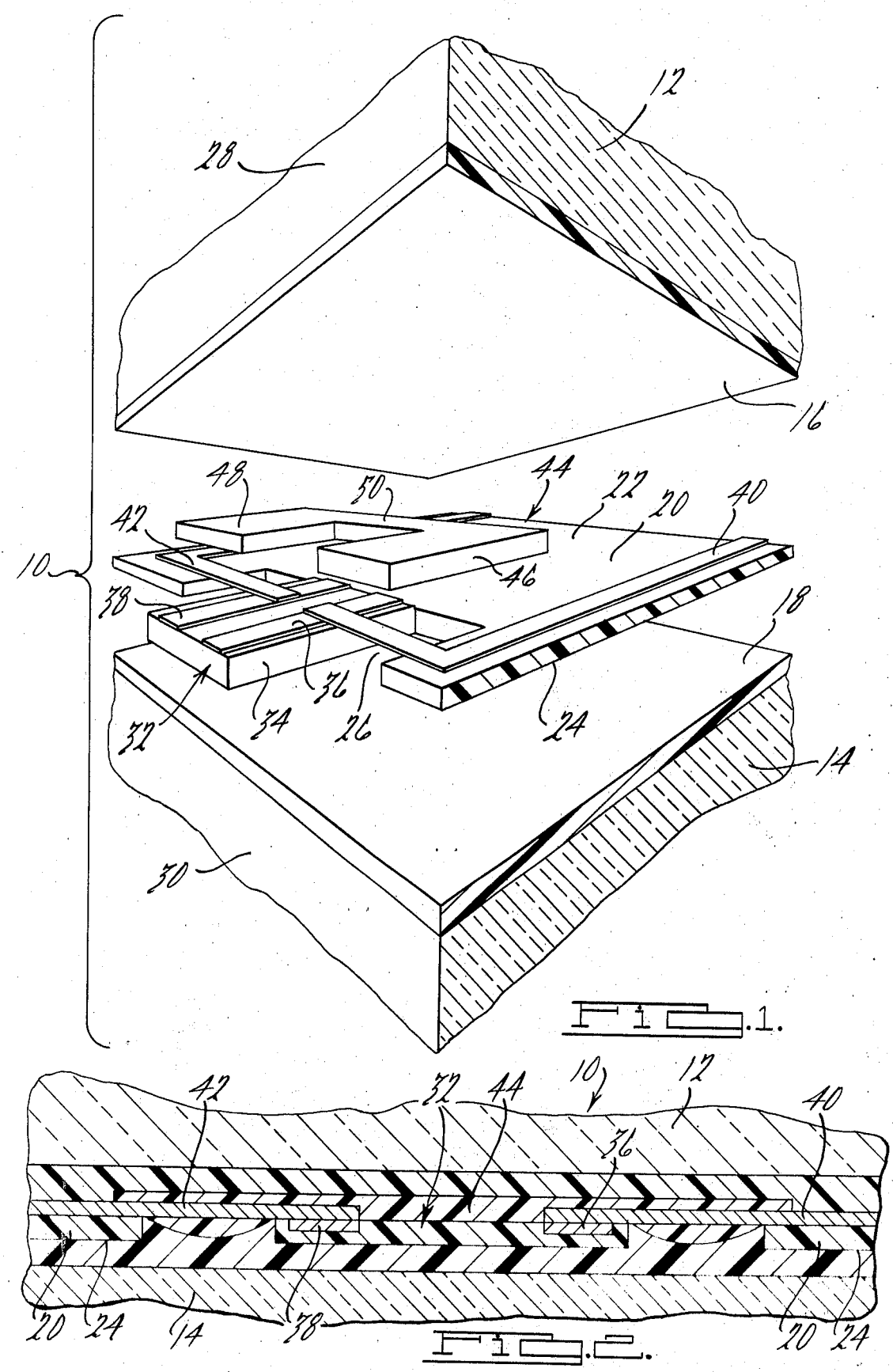
FIG. 1 is an exploded, perspective view of various components necessary to form the windshield construction of this invention. These components are shown in a disassembled condition in this FIG.
FIG. 2 is a cross section through the construction of FIG. 1 after formation of the windshield in a laminating operation.

In FIG. 1 there is shown an embodiment of a windshield, generally identified by the numeral 10, formed in accordance with the teachings of this invention. As best seen in this Figure, the windshield is formed from an upper transparent glass sheet 12 and a lower transparent glass sheet 14. A first laminating interlayer 16 is adjacent the upper lite and a second laminating interlayer 18 is adjacent the lower lite. These interlayers may be formed from a material such as polyvinylbutyral. Disposed between the first and the second laminating interlayers is a transparent interlayer 20. This interlayer has upper and lower principal faces identified respectively by the numerals 22 and 24 in FIG. 1 only. The interlayer will have a conductive coating on the upper surface thereof of a nature taught in Canadian Pat. No. 844,570. The coating on the interlayer is of such a nature that it reduces only slightly the transmission of light through the windshield but yet is of sufficient thickness to carry the current necessary to develop the heat required to defog or to defrost the windshield. The transparent interlayer 20 also has a notched out portion 26 which is adjacent leading edges 28 and 30 respectively of the upper and lower transparent glass sheets.

A circuit board, generally identified by the numeral 32, is formed of a non-conductive base portion 34 which supports circuit paths 36 and 38. The circuit paths may be formed by bonding thin copper foil to the base. The circuit board may also be formed in any of the many ways known to those skilled in the art.

An electric circuit path 40 and an electric circuit path 42, respectively connect the circuit paths 36 and 38 to the electrically conductive coating on the upper face 22 of the transparent interlayer 20. These latter mentioned circuit paths are formed of thin copper foil and are bonded to the circuit paths on the circuit board 32 by a welding operation. The location and direction of the circuit paths 40 and 42 and their manner of connection is illustrated in greater detail in the previously mentioned patent application Ser. No. 316,322.

A sealing structure, generally identified by the numeral 44, is in the form of a U-shaped member having a pair of legs 46 and 48 and an interconnecting member 50. This member may be made out of any material which is relatively stable at room temperature but which is flowable when subjected to the heat and the pressure encountered in a routine glass laminating operation. For example, the member may be made out of the same polyvinylbutyral that is utilized to form the laminating interlayers 16 and 18. The member may be positioned above or below the electric circuit paths. One leg 46 is designed to fill the area between the base 34 of the circuit board 32 and juxtaposed side wall portion of the notched out portion 26 of the transparent interlayer 20. Similarly, the second leg 48 is designed to seal the area between the base and the edge of the notched out portion on the other side of the circuit board. The interconnecting member 50 of the sealing structure 44 is designed to fill the areas and seal the area at the point where the circuit board comes in contact with the deepest portion of the notched out portion of the transparent interlayer. The sealing is best illustrated in FIG. 2 which shows the material 44 filling all of the voids, this filling taking place when the material is soft enough to flow during the heat and pressure encountered by it in a glass laminating operation.

It will, of course, be obvious that the sealed connection to a conductive interlayer may be accomplished by employing sealing strips on only the lateral edges of the circuit board that is resident within the notched out portion of the interlayer. Also, a liquid plastic material may be applied to the areas between the circuit board and the walls of the notched out portion of the interlayer and allowed to dry to a solid material, the solid being one, which fully cures during the heat and pressure of the glass laminating operation.

The desirability of sealing this area of electrical connection is quite high. If moisture or other contaminants are allowed to penetrate the windshield they may cause a short circuit condition to exist between the conductive coating on the interlayer and some metal objects supporting the windshield in a vehicle. If a short circuit condition occurs, the interlayer will burn out and the entire windshield will have to be scrapped.

Many modifications of this invention will be apparent to those skilled in the art in view of the teachings of this specification. It is intended that all such modifications which fall within the attended claims.

We claim:

1. A heatable, laminated windshield construction which comprises:
   a transparent interlayer having a pair of principal faces with a conductive coating on at least one of said faces, said conductive coating being one which produces heat when an electrical current is applied thereto, said transparent interlayer having a notched out portion,
   first and second laminating transparent interlayers positioned adjacent both principal faces of said transparent interlayer,
   first and second transparent glass sheets positioned adjacent and bonded to said laminating interlayers;

a circuit board including a non-conductive base with conductive paths thereon, said circuit board extending at least in part into said notch of said transparent interlayer;
   electrical circuit path means in part on said conductive coating of said transparent interlayer and in part on said conductive paths of said circuit board for electrically connecting said conductive paths of said circuit board to said conductive coating; and sealing means for filling in the free volume about said notch of said transparent interlayer when said windshield is subjected to heat and pressure in a laminating operation.

2. The windshield construction of claim 1 wherein:
   said sealing means is formed of the same material as said laminating interlayers.

3. The windshield construction of claim 2 wherein:
   said sealing means is a U-shaped piece of material in which each of the legs thereof in part overlays a juxtaposed portion of both a side of said circuit board and a portion of said notched out portion of said transparent interlayer, and in which the connecting portion of said U-shaped piece of material overlies the juxtaposed portion of the front of said circuit board and said transparent interlayer.

4. The windshield construction of claim 3 wherein:
   said electric circuit path means are formed by thin paths of copper foil.

* * * * *